Jan. 5, 1932.　　　　E. P. MOORE　　　　1,839,247
INSECT DESTROYER
Filed Feb. 1, 1928　　2 Sheets-Sheet 1

WITNESSES　　　　　　　　　　　　　INVENTOR
　　　　　　　　　　　　　　　　　　　E. P. MOORE
　　　　　　　　　　　　　　　　　BY
　　　　　　　　　　　　　　　　　　　ATTORNEY

Jan. 5, 1932.  E. P. MOORE  1,839,247
INSECT DESTROYER
Filed Feb. 1, 1928   2 Sheets-Sheet 2

WITNESSES

INVENTOR
E. P. MOORE
BY
ATTORNEY

Patented Jan. 5, 1932

1,839,247

UNITED STATES PATENT OFFICE

EDWARD P. MOORE, OF BERKELEY, CALIFORNIA

INSECT DESTROYER

Application filed February 1, 1928. Serial No. 251,159.

The present invention relates to insect destroyers, and its principal object is to provide an insect destroyer in which the insect is lured to pass through a zone the temperature of which has been raised to a degree causing the insect to either lose its life or to become incapaciated while flying through the zone. A further object of the invention is to use as a lure a light adapted to attract the insect and to space the heated zone sufficiently far from the light to cause the insect to pass through the same while flying toward the light and before being apprised of the presence of a heated zone. A further object of the invention is to arrange the heated zone in the form of a cylindrical column around the light so that after passing through the heated zone once the insect becomes trapped within the column and cannot leave the column without passing through the heated zone once more, and this time at slow speed which is certain to kill the insect.

Further objects of my invention will appear as the specification proceeds.

In the accompanying drawings—

Figure 1:
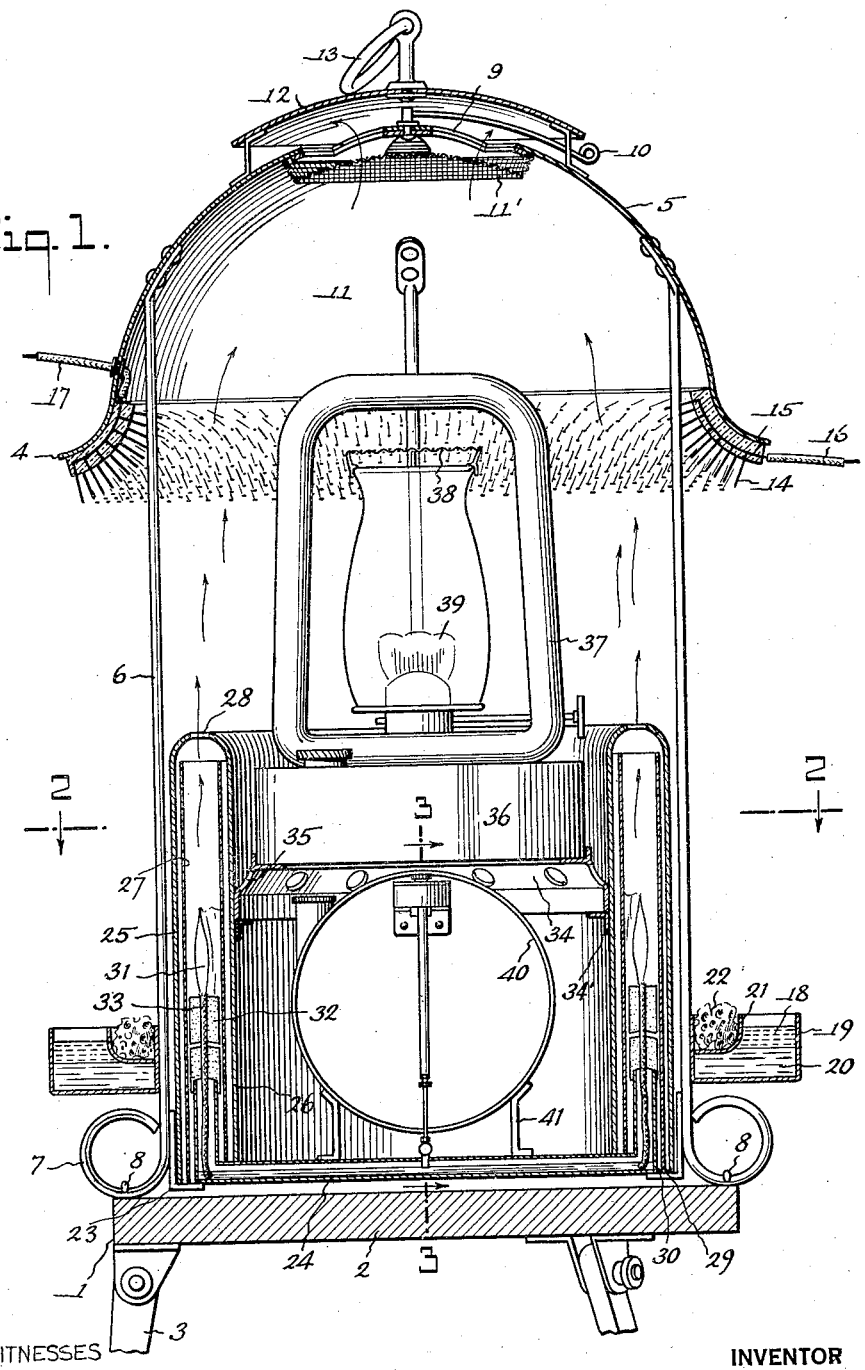
Figure 1 is a vertical sectional view through an insect destroying lantern, disclosing an embodiment of the invention.

Referring to the accompanying drawings by numerals, 1 indicates a tripod which is provided with a head 2 of any desired material, as, for instance, wood. A plurality of legs 3 are pivotally connected with head 2 whereby the parts may be folded when not in use. Mounted on the tripod 1 is an insect destroyer 4, disclosing an embodiment of the invention. This destroyer 4 is provided with a dome-shaped top 5 supported by a plurality of supporting rods 6 riveted or otherwise secured to the top 5 and provided with loops 7 at the bottom, said loops accommodating the hooks 8 whereby the loops and associated parts may be rigidly clamped onto the tripod head 2. A shutter 9 is provided at the upper part of the top 5, said shutter being capable of being opened and closed by a suitable lever 10. A wire mesh cover 11' is provided interiorly of the top or cover 5 to prevent the escape of any insects from the space or death chamber 11. A protecting plate 12 is arranged above the shutter 9, said protecting plate having connected therewith a suitable supporting ring 13, thus permitting the device to be supported from above if desired. A large number of pointed metallic members 14 are provided adjacent the lower edge of the top 5. The members 14 are in the nature of metallic needles and are connected to a source of current, supplied by the lead-in wire 16. The wire 17 acts as the lead-out wire whereby the circuit is completed. The current passing through the wires 16 and 17 is preferably a high tension current, and consequently, the members 14 will be highly charged and usually there will be a slight brush discharge, whereby insects striking these members will receive the charged electricity and will also have their wings and even parts of their body mutilated so that they are killed or so injured as to fall down into the oil 18 in the various troughs 19. This oil is treated so as to have an odor which is attractive to the insects. A supply of water 20 is arranged below oil 18 so that a comparatively large surface of oil may be provided with a minimum thickness. Cups 21 are associated with the troughs 19, said cups 21 containing preferably sponges 22 saturated with a poison lure which will attract certain of the insects.

There are shown in the drawings, four posts or supports 6, but it will be evident that a greater number or even a less number could be used without departing from the spirit of the invention. Each of these supports has rigidly secured thereto by solder or otherwise, an angle iron 23 which supports the oil or feed pan 24 and also supports the annular metallic protecting sheet 25. Coacting with sheet 25 is an interior annular sheet 26 spaced from sheet 25 so as to provide a space for the burner casing 27. The upper ends of members 25 and 26 are curved so as to present a restricted discharge opening 28. The member 26 and also the casing 27, rest on pan 24 to which they may be secured by solder if desired. From Figure 1 it will be noted that the pan 24 does not extend to the outer wall of casing 27 nor to the sheet 25, whereby air may pass freely up through the openings 29 and 30. Air passing through opening 30 acts to support the blue flame 31 which is formed by the annular blue flame burner 32, said burner having an asbestos wick 35 extending downwardly into the pan 24.

Figure 2:
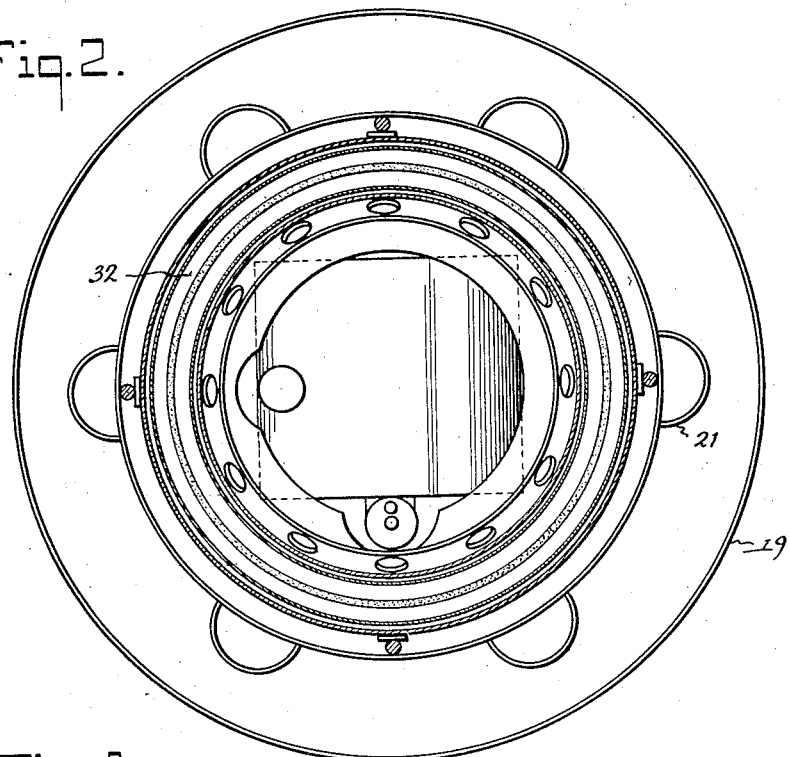
Figure 2 is a transverse sectional view through Figure 1, approximately on line 2—2.

From Figure 2 it will be noted that the burner 32 is annular so that the flame 31 is annular. As this is preferably a blue flame, the parts become very hot so that air passing through opening 29 becomes very hot and is discharged as a hot air stream out the opening 28 from which it passes in an annular sheet upwardly into the dome cover 5 and from thence out past the shutter 9. As long as the device is in operation, this tubular sheet of hot air is maintained.

Arranged interiorly of the annular sheet 26 is a supporting structure 34 which is supported by the sheet 26 through the use of brackets 34' or other suitable means, said supporting structure 34 being provided with openings 35 for permitting the passage of air. The base or tank 36 of the lantern 37 is mounted on the support 34. The lantern 37 may be an ordinary kerosene lantern now in common use, or if preferred, may be an electric lamp or other suitable lamp. The only variation in the structure of the lamp is the provision of a wire screen 38 for preventing insects from flying downwardly into the flame 39 or from falling therein. This flame being very bright acts as a lure as hereinafter fully described. Arranged below the support 34 is an oil tank 40 which may be placed in position by removing the support 34 or may be examined at any time by removing support 34 from the brackets 34'. Suitable brackets 41 support the tank 40 which contains kerosene or other oil for supplying the oil pan 24 as it needs the oil. Oil may flow by gravity from tank 40 through the passage-way 42 (Figure 3) and from thence past the needle valve 43 and then through the vacuum feed valve 44 to the pan 24. The vacuum feed valve 44 may be of any desired kind, whereby the pan 24 is supplied with oil as needed. It has been found that most insects stop flying at a temperature of about 60° or slightly below and, consequently, means have been provided for automatically closing the needle valve 43 when the temperature falls to 60°, whereby the burner 32 will be extinguished automatically. This means for closing valve 43 is shown particularly in Figure 3. Valve 43 has a steam 45 which extends through a casing 46 and the top 47 so that the thumb member 48 may be rigidly secured thereto whereby valve 43 may be opened and closed manually. A disk 49 is rigidly secured to the stem 45, said disk having an abutment 50 and a suitable aperture for receiving one end of the coil spring 51, the opposite end extending through a suitable aperture in casing 46.

Figure 3:
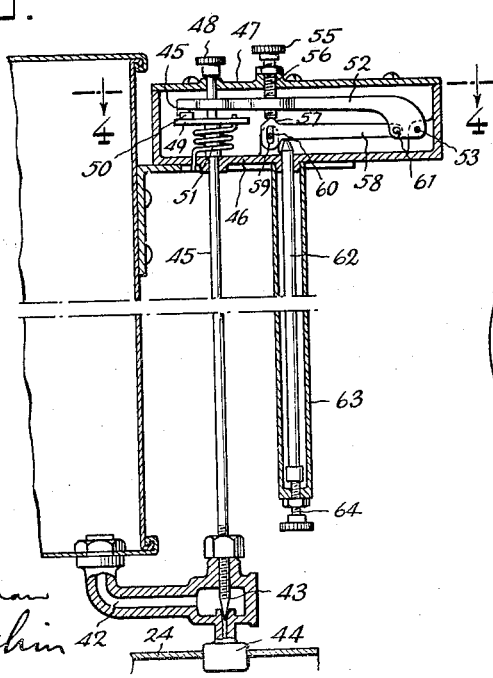
Figure 3 is an enlarged fragmentary sectional view of Figure 1 on line 3—3.
Figure 4:
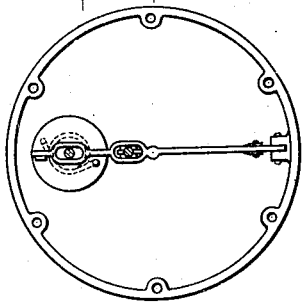
Figure 4 is a transverse sectional view through Figure 3 on line 4—4.

When the lamp is in operation, spring 51 is under tension and valve 43 is open as shown in Figure 3. A lever 52 is pivotally mounted at 53 on a suitable extension from casing 46, said lever extending beyond the stem 45 so that the lug 54 on the lever will engage lug 50 and normally prevent spring 51 from closing valve 43. A screw 55 extends through a threaded aperture in cover 47 and extends loosely through the lever 52. The lower end of screw 55 rests on a raised portion 57 of a lever 58, said lever having a slot 59 through which a pin 60 loosely passes. The lever 58 is pivotally mounted at 61 and screw 55 is adjusted so that lever 58 is continually in contact with the upper end of the glass or porcelain rod 62. A tubular thermostat 63 is threaded onto an extension of casing 46. The tubular thermostat 63 accommodates a screw 64 which bears against the lower end of the rod 62 so as to provide the desired adjustment. This thermostat responds to change in temperature and when the temperature reaches approximately 60° F. it will move a sufficient distance to shift lever 52 sufficiently to release spring 51, whereupon said spring will move valve 43 to a closed position. This will positively shut off the oil in pan 24 and in the course of a short time the flame 31 will be extinguished. The flame 39 will continue to burn until the supply of oil in tank 36 has been exhausted, or until an attendant extinguishes the same. In order for the device to again function, the lever 52 and associated parts must be readjusted or rather reset, and valve 43 opened during the resetting. This is usually done the next evening and the device again started so as to function in the evening and the early part of the night or as long as the temperature will permit. It is, of course, evident that the dead insects are removed from time to time preferably each day, and the oil and poison renewed as necessary. In using the device, it is also evident that if desired, electric current could be caused to charge the needles or prongs 14, or if preferred, the electric current could be turned off and these prongs could be used only in a mechanical sense. Whether these prongs are charged or uncharged, they will function to injure any insect striking the same.

In use, the lamp 37 is lit so as to produce flame 39 and also the burner 32 is lit to produce the annular blue flame 31, whereby an annular or tubular stream of hot air passes upwardly into the cover 5. Insects attracted by the flame 39 or by some of the lures, will fly swiftly toward the flame 39 and in doing so, will rather quickly pass through the hot air discharged through opening 28. As the insects pass through the hot air into the cooler inner air, they will usually rise into the death chamber 11 from which they may fall downwardly into the trough 19 or be held by one of the prongs or needles 14. A stream of hot air passing from the opening 28 acts to prevent the insects from escaping, though it will not prevent the insects from entering within the stream, as the insects are flying rapidly and will pass through the hot stream of air before they can stop. Having once passed the stream of hot air, the insects will try to avoid the hot air by rising and, consequently, will really move into the hot air in the cover 5 as they rise into the death chamber 11, where they are partly burned and partly suffocated.

It should be understood that my insect destroyer is capable of various modifications, the lure, for instance, instead of being an actual lamp may be a reflector made subject to the light rays emanating from the annular flame; the flame itself may be produced in any number of different ways without departure from the spirit of the invention; and the whole apparatus instead of being supported on a tripod may be suspended from any suitable support such as a pointed stick driven into the ground and terminating at the top in a goose neck.

What I claim is:

1. In an insect destroyer, a support, a plurality of standards carried by said support, a substantially dome-shaped cover mounted on top of said support, angle members connected to said support near the bottom, means forming a burner supported by said angle members, means enclosing said burner forming an air heating structure having an annular discharge opening, a lamp arranged above said annular discharge opening whereby the light from the lamp will act as a lure so that as an annular column of hot air is discharged the insects are compelled to pass therethrough to reach said light, and a poison lure arranged near said support for poisoning those of the insects not passing through said column of hot air.

2. An insect destroyer, comprising a support, a burner carried by said support, an annular trough arranged exteriorly of said burner, liquid means in the trough for receiving insects, a series of poison lures arranged adjacent said trough, a second lure arranged above said burner, and means coacting with the burner for directing a stream of hot air around said second lure for destroying the insects passing to said second lure while the remaining insects approaching the destroyer will be destroyed by said first mentioned lure and said liquid.

3. In an insect destroyer, two annular rings arranged in concentric relation and formed to provide a narrow annular chamber with a restricted annular discharge opening at the upper end, means for producing a flame in said chamber whereby a column of heated air is made to rise from the annular discharge opening, a plate carried by the inner ring and a lure supported on said plate and positioned within the column of heated air.

4. In an insect destroyer of the character described, a lure, means for causing a column of heated air to rise in encircling relation to said lure and a dome mounted above the lure and the column and having a series of needles extending from a rim section thereof for injuring insects coming in contact therewith.

5. In an insect destroyer of the character described, a lure, means for causing a column of heated air to rise in encircling relation to said lure, a dome mounted above the lure and the column and having a series of needles extending from a rim section thereof for injuring insects coming in contact therewith and means for electrically charging the needles.

EDWARD P. MOORE.